(12) United States Patent
Garces et al.

(10) Patent No.: US 6,229,278 B1
(45) Date of Patent: May 8, 2001

(54) VOLTAGE AND CURRENT LIMITING METHOD AND APPARATUS FOR A VOLTAGE/FREQUENCY DRIVE

(75) Inventors: Luis J. Garces, Schenectady, NY (US); Timothy M. Rowan, Wauwatosa, WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/408,007

(22) Filed: Sep. 29, 1999

(51) Int. Cl.[7] .................................................. H02P 5/34
(52) U.S. Cl. ............................................ 318/801; 318/805
(58) Field of Search ................................ 318/801, 805, 318/806, 798, 808

(56) References Cited

U.S. PATENT DOCUMENTS

| | | | |
|---|---|---|---|
| 3,584,279 | * | 6/1971 | Krauthamer et al. ............... 318/227 |
| 4,158,163 | * | 6/1979 | Eriksen et al. ...................... 318/798 |
| 4,317,074 | * | 2/1982 | Erth ..................................... 318/808 |
| 4,437,050 | * | 3/1984 | Overzet .............................. 318/798 |
| 4,442,394 | * | 4/1984 | Beierholm et al. ................. 318/807 |
| 4,454,930 | * | 6/1984 | Nomura et al. ................... 187/29 R |
| 4,525,660 | * | 6/1985 | Katto ................................. 318/798 |
| 5,089,760 | * | 2/1992 | Joyner, Jr. ........................ 318/798 |

* cited by examiner

Primary Examiner—Robert E. Nappi
Assistant Examiner—Rina I. Duda
(74) Attorney, Agent, or Firm—Michael A. Jaskolski; John J. Horn (57) ABSTRACT

A method and apparatus for maintaining both a DC bus voltage and a motor current within limit values wherein, when a voltage limit condition occurs, a voltage error (i.e. DC bus voltage limit minus DC bus voltage) is used to increase an inverter output frequency until the voltage limit condition subsides, and, wherein during a current limit condition a current error signal (i.e. motor current limit minus motor current) is used to reduce inverter output frequency until the current limit condition subsides, a slew rate used to control the output frequency when neither a current nor a voltage limit condition exists, the slew rate decreased as a function of the voltage limit period durations and increases a function of the current limit period durations.

27 Claims, 3 Drawing Sheets

VOLTAGE AND CURRENT LIMITING METHOD AND APPARATUS FOR A VOLTAGE/FREQUENCY DRIVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to direct current bus voltage regulators and more particularly to an apparatus for limiting both DC bus voltage and inverter output current and a voltage/frequency drive.

In motor controls, a change in inverter frequency with respect to time is referred to as a slew rate and a slew rate can be either a positive slew rate (i.e. tending to drive a motor in a clockwise direction) or a negative slew rate (i.e. tending to drive a motor in a counter-clockwise direction). A slew rate determiner is typically provided which provides a standard slew rate when there is a difference between a commanded inverter frequency and an actual inverter frequency.

The controls industry has generally recognized that an AC inverter for supplying alternating current to an AC motor can cause a DC bus voltage on a DC bus linked to the inverter to exceed a maximum safe voltage limit during regeneration. Regeneration occurs when an inverter is used to slow down a motor linked thereto by reducing the inverter/motor frequency or if the load is overhauling (i.e. the motor speed is higher than the inverter frequency).

During motor deceleration the motor operates as an electric power source providing current back through the inverter to the DC bus, hence the term regeneration. The energy delivered back to the DC bus is stored in bus capacitors and thus causes a rise in DC bus voltage. The rise in DC bus voltage can become serious when the rate at which electric power is delivered to the DC bus exceeds the maximum dissipation rate available to the bus. Under these conditions the DC bus voltage may rise dangerously high and cause damage to electrical components. In particular, the voltage may exceed the voltage rating for semiconductor switches or the DC bus capacitors and thereby may damage or destroy those components. When the bus voltage exceeds the maximum DC bus voltage the motor is said to be in an overvoltage condition or in overvoltage operation.

Also, as well known in the controls industry, dangerous/damaging currents can be caused in the inverter switches when then inverter fundamental frequency leads the motor mechanical speed or frequency by an excessive amount. This condition can occur during certain operating conditions such as, for example, during motor acceleration with a large load which tends to maintain an instantaneous motor speed as the inverter is attempting to achieve a greater relative speed. In another case, where an inverter is used to decelerate a motor via inverter braking action (i.e. providing voltages to the motor at a frequency which is less than the instantaneous motor mechanical frequency), if a mechanical brake is also used to slow the motor or if the motor load increases quickly, the motor mechanical frequency may quickly drop below the inverter frequency thereby causing the inverter to operate instantaneously as a motor with a large slip, providing an excessive motor current. When the motor current exceeds the maximum motor current the motor is said to be in an overcurrent condition or in overcurrent operation.

Methods in the prior art for keeping a motor out of overvoltage operation include, just prior to overvoltage occurring, overriding the standard slew rate to freeze the inverter frequency. Similarly, methods for keeping a motor out of the overcurrent condition include, just prior to overcurrent occurring, overriding the standard slew rate to freeze the inverter frequency. After either the overvoltage or overcurrent operation subsides, deceleration or acceleration is continued at the standard slew rate until some other limit condition occurs at which point the standard rate is again overridden.

Unfortunately, the frequency freezing solution has a number of shortcomings. First, during deceleration, as inverter frequency is rapidly altered back and forth between the standard slew rate and the frozen rate, deceleration oscillation occurs and therefore deceleration is uneven and erratic. Similarly, during acceleration, as inverter frequency is rapidly changed back and forth between the standard slew rate and the frozen rate, acceleration is erratic.

Second, despite freezing the inverter frequency just prior to an overvoltage condition, overvoltage can still occur. In this case overvoltage occurs as a result of the slip characteristics of an AC motor. Slip arises because most AC motors run at a speed slightly less than synchronous speed under motoring conditions. Even though the inverter frequency is frozen at the frequency found when the DC voltage of the bus is just below the voltage limit, the motor may continue to decelerate as a result of the slip characteristics to a speed less than the inverter frequency. This continued deceleration can cause additional DC bus voltage and therefore can cause overvoltage.

One solution for maintaining the DC bus voltage below a voltage limit is described in U.S. Pat. No. 5,089,760, which is entitled "DC Bus Voltage Regulation By Controlling The Frequency In A Variable Frequency Inverter" which issued to Joyner, Jr. on Feb. 18, 1992 (hereinafter "the '760 patent"). The '760 patent teaches a regulator wherein, just prior to overvoltage, the negative slew rate is overridden and the inverter frequency is actually accelerated slightly. This instantaneous acceleration does two things. First, the inverter frequency acceleration ensures that the motor frequency will not continue to slow down thereby causing an overvoltage condition. Second, the instantaneous acceleration allows the DC bus capacitor to dissipate some of its excess energy thereby placing a ceiling on the capacitor voltage level which is just below the overvoltage condition.

The '760 patent operates like the prior art described above to avoid overcurrent conditions. That is, just prior to an overcurrent condition during acceleration, the '760 patent configuration reduces inverter frequency acceleration to reduce motor current. While the '760 patent may very well avoid overvoltage altogether, the '760 patent solution has at least two shortcomings. First, the '760 patent neither teaches nor suggests how a maximum deceleration rate is selected. For example, after a voltage limit condition occurs, should the slew rate be reduced by 1 Hz/s, by 10 Hz/s, by 10% of the original slew rate, by 15% of the original slew rate, etc.? The problem here is that, on one hand if the deceleration rate is not decreased sufficiently the maximum DC bus voltage will be exceeded and the exact condition to be avoided (i.e. overvoltage) will occur. On the other hand, if the deceleration rate is decreased to much, the time required to reduce motor speed to a commanded speed is extended.

Second, after a modified deceleration rate is selected, the '760 patent fails to teach or suggest how an optimum rate is maintained. In fact, the '760 patent appears to include inconsistent teachings in this regard. First, with respect to FIG. 2A and text related thereto, it appears as though the '760 patent teaches that after voltage limit conditions are identified, the '760 patent configuration overrides the standard slew rate until a commanded inverter frequency is achieved. Presumably the overriding slew rate is based on the difference between the maximum DC bus voltage and the actual DC bus voltage and is adjusted to maintain the actual voltage essentially equal to the maximum DC bus voltage.

The problem with a system which modifies slew rate after a voltage limit condition occurs solely to eliminate the difference between the actual and maximum DC bus voltages is that an uncontrolled loop may occur resulting in damaging overcurrent conditions. As described above, during voltage limiting deceleration, if a load is quickly stopped via a mechanical brake or the like, the inverter actually instantaneously operates as a motor to accelerate the load thereby causing an overcurrent condition. If the slew rate is locked in the voltage limiting loop and cannot be adjusted to limit current, system damage can occur due to high overcurrents.

Second, with respect to FIG. 7 and text related thereto, the '760 patent teaches that when the '760 patent system comes out of a voltage limiting period, control reverts back to the slew determiner (i.e. ramp function 180). If another voltage limit condition occurs the standard slew rate is again overridden. Similarly, if an overcurrent condition occurs the standard slew rate is temporarily overridden. Thus, as with the prior art systems, oscillation may occur between the standard slew rate and an overriding slew rate which results in erratic acceleration and deceleration.

BRIEF SUMMARY OF THE INVENTION

According to the present invention, the DC bus voltage is measured and compared to a voltage limit and, where the DC bus voltage is greater than or equal to the limit, the standard slew rate is overridden by a voltage limit signal to reduce the deceleration rate until the motor is out of the voltage limit condition. The duration of the voltage limit period is monitored and the standard slew rate is reduced as a function of the period duration. Thus, for example, where an original slew rate is 10 Hz/s, if the duration of the period is 2 second, the modified slew rate may be 8 Hz/s whereas, if the duration of the period is 5 second, the modified slew rate may be 4 Hz/s.

After the DC voltage drops below the limit, the output frequency is again controlled by the slew rate determiner as a function of the modified slew rate. The slew rate is increased slowly until a next voltage limit condition occurs. During the next voltage limit condition, once again, a voltage limit signal is used to control the output frequency and the duration of the voltage limit period is monitored. The slew rate is again modified as a function of the duration of the most recent voltage limit period. After the DC bus drops below the limit, output frequency is again controlled as a function of the modified slew rate. As time goes on, the durations of the voltage limit periods become shorter and shorter and the output frequency is reduced as quickly and as smoothly as possible.

Similarly, when a current limit condition occurs (i.e. the motor current exceeds a current limit), a current limit signal is used instead of the slew rate to generate an output frequency for the inverter. Thus, during motor acceleration, when the motor current amplitude exceeds the current limit, the output frequency is reduced until the limit condition subsides. During the current limit condition, the limit condition period duration is monitored and, once again, the acceleration slew rate is reduced as a function of the limit condition duration. After the limit condition subsides, the modified slew rate is again used to control the output frequency.

Thus, one object of the invention is to essentially eliminate both the over current and over voltage conditions which occur in an AC controller/motor system. To this end the present invention includes voltage and current limiting subsystems.

Another object is to achieve the aforementioned objects while facilitating smooth motor acceleration and deceleration. To this end, by adjusting the acceleration and deceleration slew rates as a function of the durations of voltage limit and current limit conditions erratic acceleration and deceleration are avoided.

One other solution is to achieve the aforementioned solutions inexpensively. The present configuration requires relatively minimal hardware and software.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Hardware

Referring now to the drawings where like reference numerals and symbols represent corresponding elements and signals throughout the several views and, more specifically, referring to FIG. 1, the present invention will be described in the context of exemplary motor control system 8 which is linked to a three-phase AC induction motor 20. System 8 includes a DC bus 10, an AC inverter 12, a PWM controller 14, a voltage sensing circuit 16 and a frequency determiner 18. DC bus 10 includes a positive rail 22 and a negative rail 24 which provide a direct current (DC) to inverter 12. A DC bus capacitor 26 is linked between positive and negative rails 22, 24, respectively.

AC inverter 12 converts the DC bus voltage across rails 22 and 24 to three-phase AC voltages across, and currents $I_a$, $I_b$ and $I_c$ through, supply lines 28, 29 and 30 which are linked to motor 20 stator windings (not illustrated). Inverter 12 frequency is controlled by PWM controller 14. Controllers like controller 14 are well-known in the art and therefore operation of controller 14 will not be explained here in detail.

Voltage sensing circuit 16 is linked to rails 22 and 24 for measuring the DC bus voltage across rails 22 and 24, providing a DC voltage signal $V_{DC}$ to frequency determiner 18. First and second current sensors (e.g., Hall effect sensors) 32 and 33 are linked to supply lines 30 and 29 for detecting line currents $I_b$ and $I_c$ and providing current feedback signals $I_{cf}$ and $I_{bf}$ to frequency determiner 18. Determiner 18 also receives a clock signal CLOCK and a command frequency signal f*. Determiner 18 generates an output frequency signal $f_{out}$ as a function of received signals $V_{DC}$, CLOCK, f*, $I_{cf}$ and $I_{bf}$, signal $f_{out}$ provided to controller 14 and indicating a desired inverter current frequency.

Figure 2:
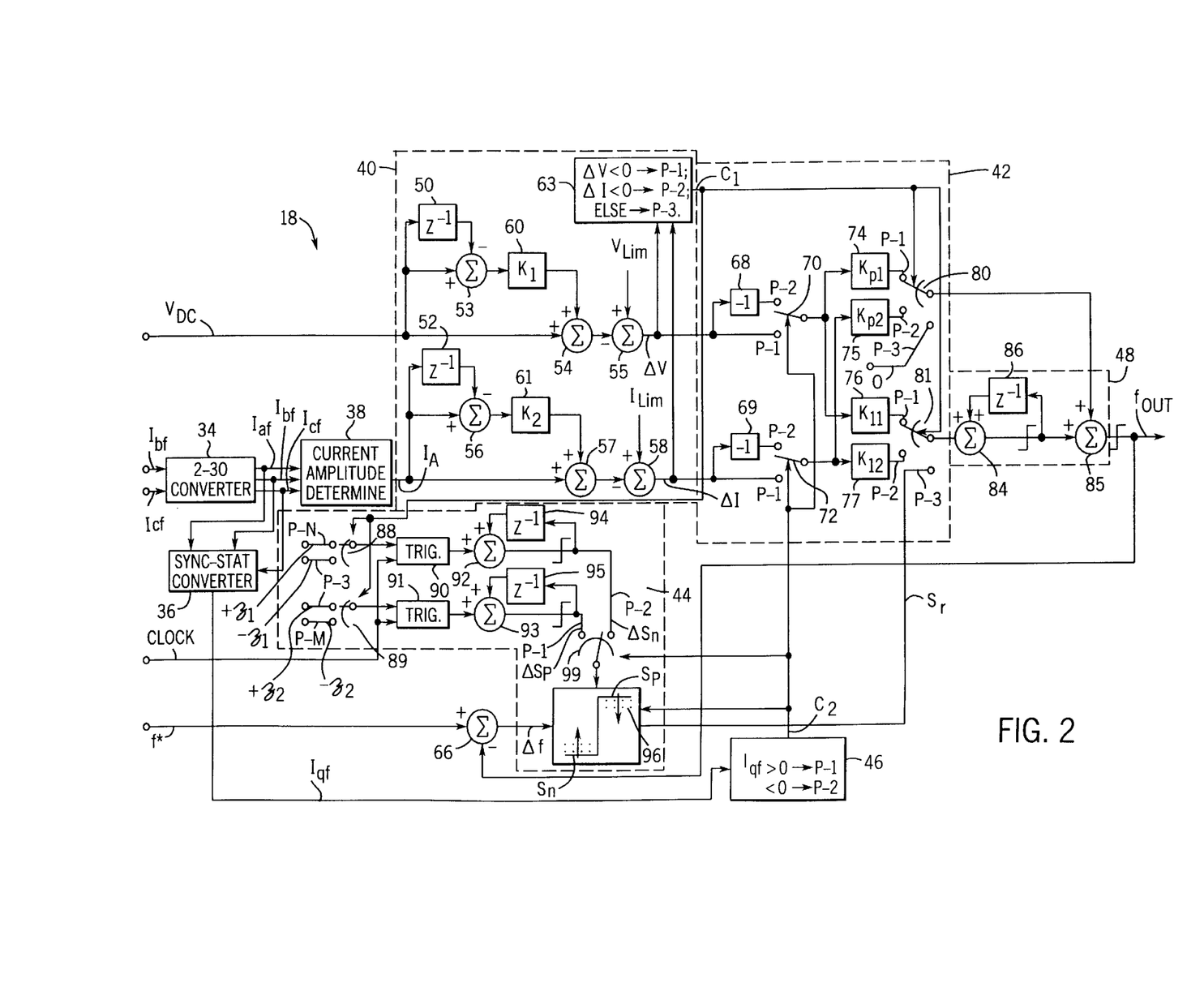
FIG. 2 is a schematic of the frequency determiner of FIG. 1.

Referring now to FIG. 2, an exemplary configuration of frequency determiner 18 is illustrated. Determiner 18 generally includes a two-to-three phase converter 34, a synchronous-to-stationary converter 36, a current amplitude determining circuit 38, an error determiner 40, an error selector 42, a slew rate modifier 44, an error polarity controller 46, an output integrator block 48 and a summer 66.

Converter 34 receives both the feedback current signals $I_{bf}$ and $I_{cf}$ and uses those two signals to determine the instantaneous amplitude of third current signal $I_a$ through line 28 and generates current feedback signal $I_{af}$. All three feedback signals $I_{af}$, $I_{bf}$ and $I_{cf}$ are provided to each of circuit 38 and converter 36. Converter 36 converts current signals $I_{af}$, $I_{bf}$ and $I_{cf}$ to two phase d and q-axis feedback currents and provides the q-axis feedback current $I_{qf}$ to error polarity controller 46. Amplitude determining circuit 38 uses current signals $I_{af}$, $I_{bf}$ and $I_{cf}$ to determine the instantaneous amplitude of motor winding current providing a current amplitude signal $I_A$ to error determiner 40.

In addition to receiving amplitude signal $I_A$, error determiner 40 also receives DC voltage signal $V_{DC}$ and uses signals $I_A$ and $V_{DC}$ to generate three signals including a first control signal $C_1$, a voltage error signal $\Delta V$ and a current error signal $\Delta I$. Each of signals $C_1$, $\Delta V$ and $\Delta I$ are provided to error selector 42 and signal $C_1$ is also provided to modifier 44. To this end, error determiner 40 includes first and second derivative blocks 50 and 52, six summers 53, 54, 55, 56, 57 and 58, two proportional gain blocks 60 and 61 and a switching logic block 63. Derivative block 50, summer 53, gain block 60 and summers 54 and 55 cooperate to generate voltage error signal $\Delta V$. Similarly, derivative block 52, summer 56, gain block 61 and summers 57 and 58 cooperate to generate current error signal $\Delta I$.

DC voltage signal $V_{DC}$ is provided to derivative block 50 which generates a DC voltage derivative which is provided to summer 53. Summer 53 also receives DC voltage signal $V_{DC}$ and subtracts the derivative signal from the DC voltage signal $V_{DC}$ providing its output to gain block 60 which increases the received signal and provides the increased signal to summer 54. Summer 54 adds the increased signal to the DC voltage signal $V_{DC}$ providing a stepped up DC voltage signal to summer 55. It should be appreciated that the derivative term generated by derivative block 50 acts as an anticipator forcing the stepped up DC voltage output by summer 54 to be higher than input DC voltage $V_{DC}$ which thereby causes anticipation of an ensuing overvoltage condition and compensates for delays due to filters in the feedback and sample delays in a digital system.

Summer 55 also receives a voltage limit signal $V_{lim}$. The value of limit signal $V_{lim}$ is typically provided by a user and is usually a voltage value which is just below a maximum sustainable and rated DC bus voltage value which should not be surpassed, hence the term "voltage limit." Summer 55 subtracts the stepped up DC voltage signal from limit signal $V_{lim}$ to generate voltage error signal $\Delta V$ which is provided to logic block 63 as well as to error selector 42.

Referring still to FIG. 2, current amplitude signal $I_A$ is provided to block 52 and subtracted from signal $I_A$ at block 56 to generate the derivative of the current amplitude. The output of summer 56 is provided to gain block 61 which proportionally increases the received signal providing the increased signal to summer 57. Summer 57 adds the increased signal to amplitude signal $I_A$ and provides a stepped up current signal to summer 58.

In addition to receiving the stepped up signal, summer 58 also receives a current limit signal $I_{lim}$. As with the voltage limit signal $V_{lim}$, current limit signal $I_{lim}$ is also typically provided by a system user and is usually a current value which is just below a maximum sustainable and rated inverter current which should not be surpassed, hence the term "current limit." Summer 58 subtracts the stepped up signal from the current limit signal ilim to generate the current error signal $\Delta I$. Error signal $\Delta I$ is provided to logic block 63 and to error selector 42.

Logic block 63 receives each of error signals $\Delta V$ and $\Delta I$ and uses those signals to generate control signal $C_1$. Where voltage error signal $\Delta V$ is negative indicating voltage limit operation, block 63 generates a control signal $C_1$ equal to P-1. Where error signal $\Delta V$ is positive (i.e. no voltage limit) but the current error signal $\Delta I$ is negative indicating current limit operation, block 63 generates control signal $C_1$ equal to P-2. Where each of error signals $\Delta V$ and $\Delta I$ are positive, block 63 generates control signal $C_1$ equal to P-3.

Figure 1:
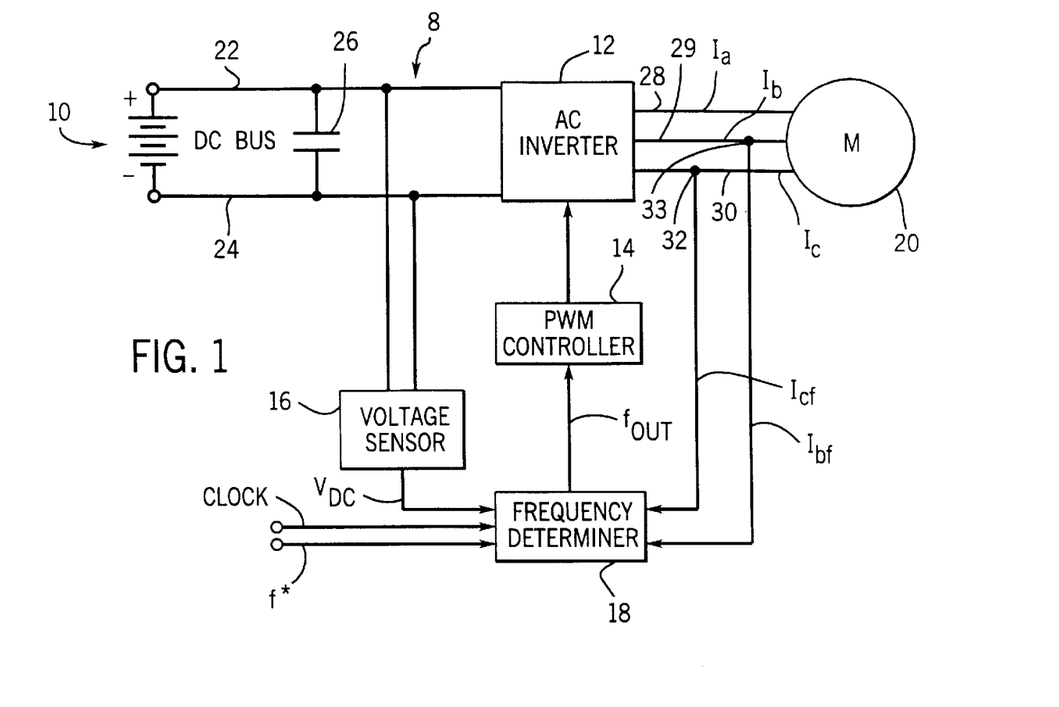
FIG. 1 is a schematic of a motor control system according to the present invention.

Referring still to FIG. 2, as well known in the controls art q-axis current signal $I_{qf}$ is a torque producing current indicating the magnitude and direction of torque which is instantaneously being applied to motor 20 (see FIG. 1). Thus, where signal $I_{qf}$ is positive (i.e. >0), the torque applied to the motor tends to drive the motor in a positive direction and where signal $I_{qf}$ is negative (i.e. <0) the torque applied to the motor tends to drive the motor in a negative direction. For the purposes of this explanation it will be assumed that the positive motor direction is clockwise while the negative direction is counter-clockwise. In this regard it should also be noted that a motor may be rotating in the positive direction (i.e. clockwise) despite application of a negative torque. In this case the torque is simply being applied to slow or brake motor rotation. Similarly, a motor may also be rotating in the negative direction despite application of a positive torque.

Error polarity controller 46 uses q-axis feedback current $I_{qf}$ to generate a second control signal $C_2$ which is provided to error selector 42, modifier 44 and determiner 96. Where feedback current $I_{qf}$ is positive (i.e. motor torque is positive), controller 46 generates control signal $C_2$ equal to P-1. In the alternative, where feedback current $I_{qf}$ is negative (i.e. motor torque is negative), controller 46 generates control signal $C_2$ equal to P-2.

Error selector 42 includes two inverters 68 and 69, two double-pole switches 70 and 71, four gain blocks 74, 75, 76 and 77 and two triple-pole switches 80 and 81.

Voltage error signal $\Delta V$ is provided at a first input P-1 to switch 70 and is also provided to inverter 68, the inverter 68 output provided at a second input P-2 to switch 70. Similarly, current error signal $\Delta I$ is provided at a first input P-1 to switch 72 and is provided to inverter 69, inverter output provided at a second input P-2 to switch 72. Each of switches 70 and 72 is controlled by control signal $C_2$. Thus, when motor torque is positive (i.e., $C_1$=P-1), switches 70 and 72 are linked to error signals $\Delta V$ and $\Delta I$, respectively. However, when motor torque is negative (i.e., $C_1$=P-2), each of switches 70 and 72 is linked to the outputs of inverters 68 and 69, respectively, thereby passing on inverted voltage and inverted current error signals $\Delta V$ and $\Delta I$, respectively.

The output of switch 70 is provided to each gain blocks 74 and 76, each of which proportionally increases their respective inputs. The outputs of gain blocks 74 and 76 are provided at first inputs P-1 to each of switches 80 and 81, respectively. Similarly, the output of switch 72 is provided to gain blocks 75 and 77 which proportionally increase their respective inputs. The outputs of blocks 75 and 77 are provided as second inputs P-2 to each of switches 80 and 81. The third input P-3 to switch 80 is linked to a zero value. The third input P-3 of switch 81 is linked to a slew rate determiner described in more detail below. Suffice it to say at this point that the slew rate determiner indicates a change in frequency with respect to time for output signal $f_{out}$ during non-limit system operation.

Control signal $C_1$ controls each of switches 80 and 81. To this end, when voltage error signal $\Delta V$ is negative indicating voltage limit operation, each of switches 80 and 81 is linked to an associated first input P-1 thereby providing output signals which are a function of voltage error signal $\Delta V$. When the voltage error signal $\Delta V$ is positive (i.e. during non-voltage limit operation) and the current error signal $\Delta I$ is negative (i.e. indicating current limit operation), each of switches 80 and 82 is linked to its associated second input P-2 thereby providing output signals which are a function of current error signal $\Delta I$. If each of errors signals $\Delta V$ and $\Delta I$ is positive (i.e. during non-limit system operation), each of switches 80 and 81 is linked to their associated third inputs P-3 and therefore the output of switch 80 is zero and the output of switch 81 is equal to the slew rate provided by the slew rate determiner.

Output integrator block 48 includes two summers 84 and 85 and a single integrator 86. The output of switch 81 is provided to summer 84 which adds that signal to the output of integrator 86. The combined signal is provided as an input to integrator 86 and also as an input to summer 85. Summer 85 also receives the output of switch 80 and adds the two received signals to generate the output frequency signal $f_{out}$.

When voltage limit operation occurs, the configuration described above modifies output frequencies $f_{out}$ in a manner which is calculated to avoid overvoltage. Similarly, when current limit operation occurs, the configuration described above modifies output frequency $f_{out}$ to avoid overcurrent. When neither voltage limit conditions nor current limit operation occurs, output frequency $f_{out}$ is controlled by the slew rate determiner (i.e. 96 via third input P-3 to switch 81).

Summer 66 receives each of command frequency signal f* and output frequency signal $f_{out}$, subtracts signal $f_{out}$ from signal f* generating a frequency error signal $\Delta f$ and provides error signal $\Delta f$ to determiner 96.

Referring still to FIG. 2, slew rate modifier 44 includes three switches 88, 89 and 99, two triggering blocks 90 and 91, two summers 92 and 93, two integrators 94 and 95 and a slew rate determiner 96.

Each of switches 88 and 98 is a double-pole switch including two inputs. Switch 88 includes an input P-N and an input P-3 and a single output whereas switch 89 includes an input P-3, a second input P-M and a single output. Small positive and negative values $+\zeta_1$ and $-\zeta_1$ are provided at inputs P-N and P-3. In this exemplary embodiment each of inputs $+\zeta_1$ and $-\zeta_1$ is a small fraction (e.g. 5–10%) of a standard slew rate. Thus, for example, where a standard slew rate is 10 Hz/s, value $+\zeta_1$ may be +1 Hz/s and value $-\zeta_1$ may be −1 Hz/s. Preferably, values $+\zeta_1$ and $-\zeta_1$ are modifiable by a system user. Similarly, values $-\zeta_2$ and $+\zeta_2$ are provided at inputs P-M and P-3 to switch 89, each of values $-\zeta_2$ and $+\zeta_2$ being variable and each being a small fraction of a standard slew rate.

Each of switches 88 and 89 is controlled by control signal $C_1$. With respect to switch 88, N may be either 1 or 2 and with respect to switch 89, M may be either 1 or 2. Thus, during voltage limit operation where control signal $C_1$ is P-1, $+\zeta_1$ is provided as the output of switch 88 and $-\zeta_2$ is provided as the output of switch 89. During current limit operation where signal $C_1$ is equal to P-2, $+\zeta_1$ is provided at the output of switch 88 and $-\zeta_2$ is provided at the output of switch 89. When non-limit operation occurs and signal $C_1$ is equal to P-3, $+\zeta_1$ is provided at the output of switch 88 and $-\zeta_2$ is provided at the output of switch 89. Block 90 receives the output of switch 88 and also receives clock signal CLOCK at a trigger input. Block 90 passes the output signal from switch 88 to summer 92 each clock signal CLOCK pulse. Similarly, block 91 receives the output of switch 89 and also receives clock signal CLOCK at a trigger input and passes the output of switch 89 to summer 93 each time a clock signal CLOCK pulse is received. Summer 92 adds the outputs of block 90 and integrator 94 to generate an integrated signal which is provided as the input to integrator 94, as an input to inverter 98 and at a second input P-2 to switch 99. Similarly, summer 93 adds the outputs of block 91 and integrator 95 to generate an integrated signal which is provided as an input to integrator 95 and at input P-1 of switch 99. Switch 99 is controlled by control signal $C_2$. Therefore, when motor torque is positive (i.e. $I_{qf}$ is positive and $C_2$=P-1), switch 99 links input P-1 to the switch 99 output but when torque is negative switch 99 output is linked to P-2.

Generally, determiner 96 receives error signal $\Delta f$, and uses signal $\Delta f$ to generate a slew rate signal $S_r$ which is provided to the third input P-3 of switch 81. For purposes of this explanation, the term "negative slew rate" $S_n$ will be used to refer to a slew rate causing a motor to change from a clockwise rotational frequency to a second relatively slower clockwise rotational frequency or from a clockwise rotational frequency to a counter-clockwise rotational frequency or from a first counter-clockwise rotational frequency to a relatively faster counter-clockwise rotational frequency. Similarly, the term "positive slew rate" will be used to refer to a slew rate tending to cause a motor frequency to change from a first counter-clockwise rotational frequency to a relatively slower counter-clockwise rotational frequency or from a counter-clockwise rotational frequency to a clockwise rotational frequency or from a first clockwise rotational frequency to a relatively faster second clockwise rotational frequency.

When command frequency f* is more positive than output frequency $f_{out}$ so that error signal $\Delta f$ is positive, determiner 96 provides a positive slew rate $S_P$ as signal S, tending to cause motor 20 (see FIG. 1) to either accelerate (i.e. if rotation is already clockwise) or to decelerate (i.e. if rotation is counter-clockwise). Similarly, when command frequency f* is more negative than output frequency fout so that error signal $\Delta f$ is negative, determiner 96 provides a negative slew rate $S_n$ as signal $S_r$ tending to cause the motor to either decelerate if rotation is clockwise or accelerate if rotation is counterclockwise.

In addition to receiving error signal $\Delta f$, determiner 96 also receives the output of switch 99 and control signal $C_2$. The output of switch 99 is used to modify either the positive or negative slew rate, depending on the direction of torque producing current $I_{qf}$. Where signal $C_2$ is equal to P-1 (i.e. positive torque), determiner 46 adds the output of switch 94 to the positive slew rate $S_p$. Where signal $C_2$ is equal to P-2 (i.e. negative torque), determiner 96 adds the output of switch 99 to the negative slew rate $S_n$.

Figure 3:
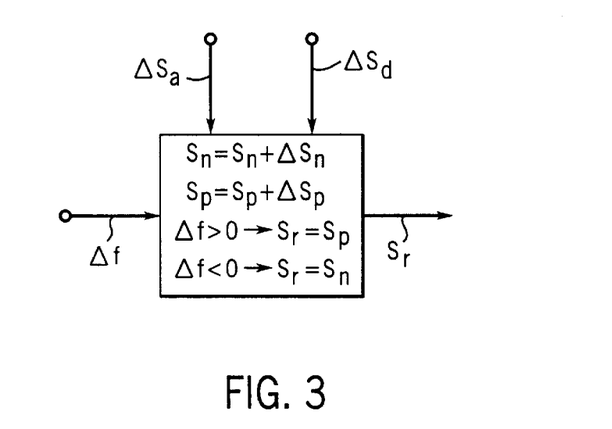
FIG. 3 is a schematic of the slew rate determiner of FIG. 2.

Referring now to FIGS. 2 and 3, to modify an instantaneous slew rate determiner 96 performs a number of calculations. Initially, determiner 96 is provided with initial positive slew rate $S_p$ and negative slew rate $S_n$. For example, slew rate $S_p$ may be +10 Hz/s and slew rate $S_n$ may be -10 Hz/s. Rate $S_n$ is modified as a function of signal $\Delta S_n$ and rate $S_p$ is modified as a function of signal $\Delta S_p$ according to the following equations:

$$S_n = S_n + \Delta S_n \quad (1)$$

$$S_p = S_p + \Delta S_p \quad (2)$$

After rates $S_p$ and $S_n$ are determined according to Equations 1 and 2 above, determiner 96 selects one of the rates $S_p$ or $S_n$ as a function of frequency error $\Delta f$ to pass on as slew rate signal $S_r$ according to the following two equations:

$$\Delta f > 0 \rightarrow S_r = S_p \quad (3)$$

$$\Delta f < 0 \rightarrow S_r = S_n \quad (4)$$

Determiner 96 provides the slew rate signal $S_r$ at its output.

B. Operation

Operation of the present invention will be explained in the context of four different operating and control conditions. First, referring to FIG. 1, operation of the invention will be described wherein motor 20 is rotating in a clockwise (i.e. positive) direction and system 8 is used to slow down motor rotation. Second, the invention will be described wherein motor 20 is rotating in the clockwise direction and is being accelerated via system 8. Third, the invention will be described wherein motor 20 is initially rotating in a counter-clockwise direction and system 8 is used to slow down motor rotation. Finally, the invention will be described wherein motor 20 is initially rotating in a counter-clockwise direction and system 8 is used to speed up motor rotation in a counter-clockwise direction.

1. Deceleration—Clockwise Rotation

Referring to FIGS. 1 and 2, assuming that limit conditions do not initially exist, initial clockwise motor rotation and a steady state wherein output frequency $f_{out}$ is essentially equal to instantaneous command frequency f*, referring also to FIG. 2, when command frequency f* is reduced to slow motor 20, frequency f* dips below output frequency $f_{out}$ and error signal $\Delta f$ becomes negative. Negative signal $\Delta f$ is provided to determiner 96 which, because the frequency error $\Delta f$ is negative, provides the negative slew rate $S_n$ as slew rate signal $S_r$ (see Equation 4). Thus, negative slew rate $S_n$ is provided at input P-3 to switch 81 and, through block 48, decreases output frequency $f_{out}$ as desired.

In addition when output frequency $f_{out}$ is decreased, a negative torque is applied to the motor which is reflected in q-axis current $I_{qf}$ which is also negative. Thus, controller 46 sets control signal $C_2$ equal to P-2 thereby causing switch 70 to link its P-2 input to the switch 70 output. This linking causes the inverse of voltage error signal $\Delta V$ to be passed to gains 74 and 76 and to inputs P-1 of switches 80 and 81.

Referring still to FIGS. 1 and 2, as motor 20 decelerates, in certain situations, motor 20 generates electrical current which is delivered back through inverter 12 to DC bus 10 causing bus capacitor 26 to charge. As the voltage across bus 10 rises, the bus voltage is sensed by circuit 16 and DC bus voltage $V_{DC}$ is provided to determiner 18. Blocks 50 and 60 and summers 53 and 54 cooperate to step up the DC voltage signal $V_{DC}$ which is then provided to summer 55. Summer 55 compares the voltage limit $V_{lim}$ to the stepped up DC voltage thereby generating voltage error signal $\Delta V$. When the stepped up DC bus voltage exceeds the voltage limit signal $V_{lim}$ such that a voltage limit operation occurs, voltage error signal $\Delta V$ becomes negative and block operation 63 generates control signal $C_1$ equal to P-1 triggering two separate occurrences. First, control signal $C_1$ causes switches 80 and 81 to connect to their respective P-1 inputs thereby causing a function of the voltage error signal $\Delta V$ to increase the output frequency $f_{out}$ slightly.

Second, control signal $C_1$ causes switch 88 to select the P-N input thereby adding $+\zeta_1$ to the negative slew rate $S_n$ (i.e. decreasing the negative slew rate) when each clock signal CLOCK pulse is received by block 90.

When the output frequency $f_{out}$ is increased slightly in this manner the amount of regenerated current is reduced and the charge across DC bus capacitor 26 is allowed to dissipate. Eventually, as the DC bus voltage $V_{DC}$ decreases, the voltage error signal $\Delta V$ becomes positive and control signal $C_1$ is again set to P-3. At this point, each of switches 80 and 81 are switched to their respective P-3 inputs thereby passing the slew rate signal $S_r$ to block 48 for controlling output frequency $f_{out}$.

In addition, the modified negative slew rate $S_n$ is provided as slew rate signal $S_r$. It should be appreciated that the modified negative slew rate $S_n$ has been decreased (i.e. is not as steep as before the voltage limit condition) and therefore the motor will not be driven into the voltage limiting condition as rapidly as previously.

When control signal $C_1$ is set to P-3, switch 88 is linked to its P-3 input thereby providing signal $-\zeta_1$ to block 90 to increase the negative rate $S_n$ each time clock signal CLOCK is received by block 90. Thus, while the negative slew rate $S_n$ will be less than its initial value, rate $S_n$ is increased each clock signal CLOCK pulse until another voltage limit condition occurs. When the second voltage limit condition occurs, despite having caused the second voltage limit condition, the negative slew rate will typically be less than the initial negative slew rate and more similar to an ideal negative slew rate which causes only short periods of voltage limit operation. Nevertheless, because voltage limit operation occurred, once again, switches 80 and 81 are linked such that a function of the voltage error signal $\Delta V$ is used to increase the output frequency $f_{out}$ slightly. In addition, switch 88 is again linked such that the negative slew rate $S_n$ is decreased. After the second voltage limit condition subsides, control is again returned to slew rate determiner 96 which provides the adjusted negative slew rate $S_n$ as the slew rate signal $S_r$ for, once again, decreasing the output frequency $f_{out}$. This iterative process continues with the durations of voltage limit periods becoming shorter and shorter until the negative slew rate $S_n$ is essentially ideal and thereby causes only short voltage limit periods.

2. Acceleration—Clockwise Rotation

Referring still to FIGS. 1 and 2, assuming initial clockwise motor rotation and that it is desired to increase the output frequency $f_{out}$, the commanded frequency f* is increased thereby causing summer 66 to generate a positive frequency error signal $\Delta f$ which is provided to determiner 96. Referring also to FIG. 3, because frequency error signal $\Delta f$ is positive, slew rate signal $S_r$ is set equal to positive slew rate $S_p$. Signal $S_r$ is provided to block 48 via switch 81 and thereby increases the output frequency $f_{out}$. In this case, because the motor is being accelerated in the clockwise (i.e. positive) direction, q-axis torque producing current $I_{qf}$ is positive so that signal $C_2$ is P-1 and switch 72 is linked to the P-1 input thereby passing current error signal $\Delta I$ for modifying frequency $f_{out}$.

As the output frequency $f_{out}$ is increased, under certain circumstances current limit operation will occur. To sense current limit operation, sensors 32 and 33 provide feedback signals $I_{bf}$ and $I_{cf}$ to converter 34 which converts the two phase current to three phase current which is in turn provided to circuit 38 to generate current amplitude signal $I_A$. Signal $I_A$ is stepped up and compared to current limit signal $I_{lim}$ via summer 58 to generate current error signal $\Delta I$. Where a current limit condition occurs error $\Delta I$ is negative and therefore block 63 generates a command signal $C_1$ equal to P-2. Control signal $C_1$ in this case causes switches 80 and 81 to link to respective inputs P-2 thereby passing functions of error signal $\Delta I$ to block 48 for modifying output frequency $f_{out}$. In this case, because switch 72 is linked to non-inverted input P-1, during current limit operation signal $\Delta I$ (which is negative) decreased output frequency $f_{out}$. When frequency $f_{out}$ is decreased, motor current is reduced and current limit operation subsides. In addition to linking switches 80 and 81 to inputs P-2, when control signal $C_1$ is equal to P-2, switch 89 is linked to input P-M such that $-\zeta_2$ is provided to block 91 and thereby to summer 93 each clock signal CLOCK pulse. Signal $-\zeta_2$ and the output of integrator 95 are added and provided as signal $\Delta S_p$. Because signal $C_2$ is P-1 (i.e. torque is positive), switch 99 passes signal $\Delta S_p$ to determiner 96 and determiner 96 adds signal $\Delta S_p$ to positive slew rate $S_p$. In this case signal $\Delta S_p$ is a negative value and therefore according to FIG. 3, positive slew rate $S_p$ is decreased.

When the current limit condition subsides, switches 80 and 81 are linked to their P-3 inputs and the reduced positive slew rate $S_p$ is provided as slew rate $S_r$ to block 48 to again increase the output frequency $f_{out}$. Once again, because no limit condition occurs, logic 63 sets control signal $C_1$ equal to P-3 thereby causing switch 89 output to link to input P-3 and provide $+\zeta_2$ through block 91 to summer 93 each time a clock signal CLOCK pulse is received. This $+\zeta_2$ signal begins to increase the positive slew rate $S_p$ thereby increasing the slew rate signal $S_r$. Eventually, the slew rate $S_r$ is again increased to the point to where a current limit condition occurs. During the second current limit condition, once again switches 80 and 81 are linked to inputs P-2 and output frequency $f_{out}$ is decreased to force the system out of current limit operation. Once again, during current limit operation, switch 89 is linked to input P-M thereby causing the positive slew rate $S_p$ to decrease each clock signal CLOCK pulse. When system 8 comes out of the second current limit condition, again output frequency $f_{out}$ is controlled by slew rate signal $S_r$ and the positive slew rate $S_p$ slowly increases until a current limit condition occurs.

3. Deceleration—Counter-Clockwise Rotation

Referring also to FIGS. 1 and 2, it should be appreciated that as motor 20 rotates in a counter-clockwise direction, a positive torque (i.e. a torque in the clockwise direction) must be applied to motor 20 to decrease rotational speed. To apply such a positive torque, the inverter current frequency must be relatively more positive than the motor frequency and therefore the slew rate $S_r$ is positive. As described above, when torque is applied to motor 20 to slow motor rotation, motor 20 generates currents which are forced through inverter 12 to bus 10 and which tend to charge capacitor 26. Eventually, capacitor 26 charges to the point where the DC bus voltage $V_{DC}$ exceeds the voltage limit $V_{lim}$ and the voltage error $\Delta V$ becomes negative causing block 63 to generate command signal $C_1$ equal to P-1. In this case, switches 80 and 81 are linked to their P-1 inputs and a function of voltage error $\Delta V$ is used to modify the output frequency $f_{out}$. Referring to controller 46, because the slowing torque in this case is positive, controller 46 generates a command signal $C_2$ equal to P-1 thereby linking switch 70 to its P-1 input. Thus, because voltage error signal $\Delta V$ is negative, as desired, the output frequency $f_{out}$ is made more negative (i.e. is decelerated) thereby reducing the regenerated current and allowing capacitor 26 to dissipate energy.

In addition, while system 8 is in voltage limit operation, control signal $C_1$ is also provided to switch 89 causing switch 89 to link input P-M to its output. Moreover, control signal $C_2$ (i.e. P-1 because q-axis torque producing current $I_{qf}$ is positive) causes switch 99 to link to its P-1 input. Thus, a function of value is provided as signal $\Delta S_p$. This negative modifying signal $\Delta S_p$ causes the positive slew rate $S_p$ to decrease (see FIG. 3). Thus, when system 8 comes out of voltage limit operation, the positive slew rate $S_p$ is less steep than the initial positive slew rate and is closer to an ideal positive slew rate.

After system 8 comes out of voltage limit operation, as described above, modifier 44 again begins to increase the slope of the positive slew rate $S_p$ until another voltage limit condition occurs. Thereafter, once again, modifier 44 decreases the positive slew rate $S_p$ during the second period of voltage limit operation. Eventually, while system 8 continues to oscillate back and forth between voltage limit operation and non-limit operation, the periods of voltage limit become less and less and the degree of voltage limit becomes minimal thereby resulting in essentially ideal system operation.

4. Acceleration—Counter-Clockwise Rotation

Now, considering the case wherein initially motor 20 is operating in the counter-clockwise direction and it is desired to increase the speed of motor 20 in the counter-clockwise direction, in order to accomplish this speed modification, command frequency f* must be more negative than output frequency $f_{out}$ such that frequency error $\Delta f$ is negative and slew rate $S_r$ is therefore equal to the negative slew rate $S_n$ (see FIG. 3). In addition, to increase the counter-clockwise speed of motor 20 the torque producing current $I_{qf}$ is negative such that controller 46 generates a command signal $C_2$ equal to P-2.

Assuming the slew rate $S_r$ causes a relatively rapid motor speed change, system 8 is forced into current limit operation. As described above, when current limit operation occurs, block 63 generates command signal $C_1$ equal to P-2 thereby linking switches 80 and 81 to their P-2 inputs and modifying the output frequency $f_{out}$ as a function of derivative of the current error signal $\Delta I$. In this case, because error signal $\Delta I$ is negative and command signal $C_2$ is equal to P-2 (i.e. the torque producing current $I_{qf}$ is negative), switch 72 is linked to its P-2 input. Thus, the negative error signal $\Delta I$ is inverted by inverter 69 and the output frequency $f_{out}$ is made slightly more positive.

In addition, control signal $C_1$ causes switch 88 to be linked to its P-N input while control signal $C_2$ causes switch 99 to be linked to its P-2 input. This combination of switches 88 and 99 causes modifying negative slew rate signal $\Delta S_n$ to be positive thereby making the negative slew rate $S_n$ more positive (i.e. reducing the slope of negative slew rate $S_n$). Thus, during current limit operation with a negative torque, the slew rate $S_r$ is made more positive than the initial slew rate.

When system 8 comes out of current limit operation, the slew rate $S_r$ is closer to an ideal slew rate. However, once current limit operation subsides, modifier 44 again begins to increase the slope of the negative slew rate $S_n$ and hence increases the slope of the slew rate signal $S_r$ until another current limit condition occurs. This oscillation between current limit operation and non-limit operation continues with reduced current limit period durations and minimal overcurrent operation.

Although not illustrated in FIG. 2, it is preferred that modifier 44 include limiters for limiting the maximum positive and negative slew rates. In this case, the maximum rates would typically be equal to standard rates associated with a particular type of motor. The following exemplary method would include rate determiners.

Figure 4:
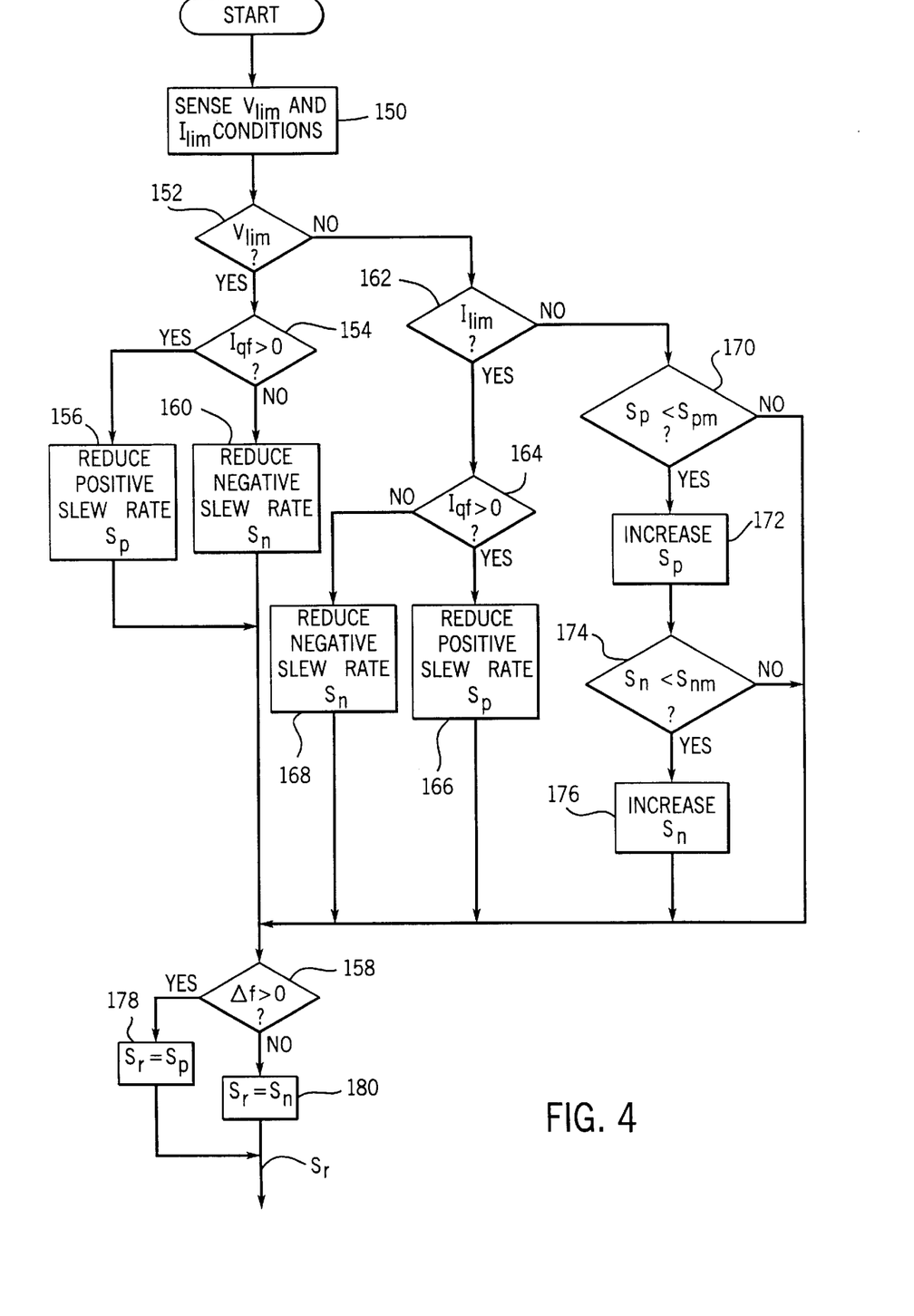
FIG. 4 is a flow chart illustrating the inventive method.

Referring now to FIG. 4, a generalized method according to the present invention is illustrated. In FIG. 4, at block 150 both current limit and voltage limit conditions are monitored. At block 152, where a voltage limit condition occurs, control passes to block 154 where the polarity of the q-axis torque producing current $I_{qf}$ is determined. Where current $I_{qf}$ is positive, control passes to block 156 where the positive slew rate $S_p$ is reduced before control passes to block 158. Where current $I_{qf}$ is negative, control passes to block 160 where the negative slew rate $S_n$ is reduced before control is passed to block 158.

Referring still to FIG. 4, where operation is not in a voltage limit condition at block 152, control passes to decision block 162 where current limit conditions are checked. Where current limit conditions exist, control passes to decision block 164 where the torque producing current $I_{qf}$ polarity is again checked. Where current $I_{qf}$ is positive, control passes to block 166 where the positive slew rate $S_p$ is reduced. Where current $I_{qf}$ is negative, however, control passes to block 168 where the negative slew rate $S_n$ is reduced.

At block 162, where operation is not in a limit condition, control passes to block 170 where the positive slew rate $S_p$ is compared to a maximum positive slew rate $S_{pm}$. Where the positive slew rate $S_p$ is less than the maximum positive slew rate $S_{pm}$, control passes to block 172 where the positive slew rate $S_p$ is increased and control passes to block 174. Where 30 positive slew rate $S_p$ is greater than the maximum positive slew rate $S_{pm}$, control passes to block 158.

At block 174, negative slew rate $S_n$ is compared to a maximum negative slew rate $S_{nm}$ and, where negative slew rate $S_n$ is less than the maximum negative slew rate $S_{nm}$, control passes to block 176 where negative slew rate $S_n$ is increased. In the alterative, control passes to block 158.

At block 158, the polarity of frequency error signal $\Delta f$ is determined. Where error signal $\Delta f$ is positive, control passes to block 178 where the slew rate $S_r$ is said equal to the positive slew rate $S_p$. In the alternative, control passes to block 180 where the slew rate $S_r$ is said equal to the negative slew rate $S_n$. The slew rate $S_r$ is then provided to input P-3 of switch 81 (see FIG. 2) for controlling output frequencies $f_{out}$ when non-limit system operation occurs.

Thus, the invention includes a general method for minimizing voltage limit and current limit operation including the steps of generating a voltage error signal to indicate when a DC bus voltage exceeds a threshold voltage level, periods during which a voltage error signal is generated being voltage limit periods and other periods being non-limit periods, generating positive and negative slew rate signals, a slew rate being a rate of motor frequency change, determining the polarity of motor torque, selecting the error signal during limit periods and during non-limit periods, when the torque is positive selecting the positive slew rate and, when the torque is negative, selecting the negative slew rate for determining the inverter frequency and modifying the slew rate signals as a function of the durations of the limit and non-limit periods. Furthermore, preferably, the inventive method includes the steps generating a current error signal indicating when motor current exceeds a threshold current level, periods when a current error signal is generated being current limit periods, during current limit periods when the voltage error determiner fails to generate a voltage error signal, the step of selecting including selecting the current error signal for determining the inverter frequency.

In the cases described above, the step of modifying includes the steps of, when the torque is negative, reducing the positive slew rate magnitude during voltage limit periods and increasing the positive slew rate magnitude during non-limit periods, reducing the negative slew rate magnitude during current limit periods and increasing the negative slew rate magnitude during non-limit periods and, when the torque is positive, reducing the negative slew rate magnitude during voltage limit periods and increasing the negative slew rate magnitude during non-limit periods, reducing the positive slew rate magnitude during current limit periods and increasing the positive slew rate magnitude during non-limit periods.

It should be understood that the methods and apparatuses described above are only exemplary and do not limit the scope of the invention, and that various modifications could be made by those skilled in the art that would fall under the scope of the invention. To apprise the public of the scope of this invention, the following claims are made:

What is claimed is:

1. An apparatus for use with a system including a variable speed AC motor, a controller and an inverter, the inverter linked to and drawing direct current from a DC bus and linked to and supplying alternating current to the motor, the controller linked to the inverter and receiving and using an output frequency signal to control inverter frequency and thereby motor speed, the apparatus for regulating inverter frequency to maintain DC bus voltage and a supply line current amplitude below a voltage limit and a current limit, respectively, the apparatus comprising:

a DC bus voltage error determiner linked to the DC bus for generating a voltage error signal to indicate when the DC bus voltage exceeds a threshold voltage level, periods during which a voltage error signal is generated being voltage limit periods and other periods being non-limit periods;

a slew rate determiner for generating a decelerating slew rate signal, the slew rate being a rate of motor frequency change;

a selector linked to the error determiner and the rate determiner for selecting the error signal during limit periods and selecting the slew rate signal during non-limit periods for determining the inverter frequency; and a modifier liked to the rate determiner for modifying the slew rate signal as a function of the durations of the limit and non-limit periods.

2. The apparatus of claim 1 wherein the modifier modifies by reducing a decelerating slew rate as a function of limit period durations and increasing the decelerating slew rate as a function of the non-limit periods.

3. The apparatus of claim 2 further including a current error determiner for generating a current error signal indicating when the motor current exceeds a threshold current level, periods when a current error signal are generated being current limit periods, during current limit periods when the voltage error determiner fails to generate a voltage error signal, the selector selecting the current error signal for determining the inverter frequency.

4. The apparatus of claim 3 wherein the slew rate determiner also generates an accelerating slew rate signal and the modifier modifies the accelerating slew rate as a function of the current limit periods.

5. The apparatus of claim 4 wherein the modifier modifies by reducing the accelerating slew rate as a function of the current limit periods and increasing the accelerating slew rate as a function of the non-current limit periods.

6. The apparatus of claim 5 wherein the voltage and current are periodically sampled and the modifier reduces the decelerating slew rate a predefined amount each sampling instant during a voltage limit period, increases the decelerating slew rate a predefined amount each sampling instant during a non-voltage limit period, increases the accelerating slew rate a predefined amount each sampling instant during a non-current limit period and decreases the accelerating slew rate a predefined among each sampling instant during a current limit period.

7. The apparatus of claim 1 wherein a maximum decelerating slew rate is specified and the modifier increases the decelerating slew rate only up to the maximum slew rate.

8. The apparatus of claim 6 wherein maximum accelerating and decelerating slew rates are specified and the modifier increases the decelerating slew rate only up to the maximum decelerating slew rate and increases the accelerating slew rate only up to the maximum accelerating slew rate.

9. The apparatus of claim 1 wherein the voltage error sensor includes a voltage sensor for sensing the DC bus voltage and generating a voltage signal, an anticipator for generating a voltage derivative which is the derivative of the voltage signal, a voltage summer for mathematically combining the voltage derivative and the voltage signal to generate a combined voltage signal and a comparator for comparing the combined voltage signal to the voltage threshold and, when the combined voltage signal is greater than the threshold, generating a voltage error signal.

10. The apparatus of claim 9 wherein the summer mathematically combines by adding.

11. The apparatus of claim 3 wherein the current error sensor includes a current sensor for sensing the line current amplitude and generating a current signal, an anticipator for generating a current derivative which is the derivative of the current signal, a current summer for mathematically combining the current derivative and the current signal to generate a combined current signal and a comparator for comparing the combined current signal to the current threshold and, when the combined current signal is greater than the threshold, generating a current error signal.

12. The apparatus of claim 11 wherein the summer mathematically combines by adding.

13. The apparatus of claim 3 wherein the voltage and current thresholds are the voltage and current limits, respectively.

14. A method for use with a system including a variable speed AC motor, a controller and an inverter, the inverter linked to and drawing direct current from a DC bus and linked to and supplying alternating current to the motor, the controller linked to the inverter and receiving and using an output frequency signal to control inverter frequency and thereby motor speed, the method for regulating inverter frequency to maintain DC bus voltage and a supply line current amplitude below a voltage limit and a current limit, respectively, the method comprising the steps of:

generating a voltage error signal to indicate when the DC bus voltage exceeds a threshold voltage level, periods during which a voltage error signal are generated being voltage limit periods and other periods being non-limit periods;

generating a decelerating slew rate signal, the slew rate being a rate of motor frequency change;

selecting the error signal during limit periods and selecting the slew rate signal during non-limit periods for determining the inverter frequency; and modifying the slew rate signal as a function of the durations of the limit and non-limit periods.

15. The method of claim 14 wherein the step of modifying includes reducing a decelerating slew rate as a function of limit period durations and increasing the decelerating slew rate as a function of the non-limit periods.

16. The method of claim 15 further including the steps of generating a current error signal indicating when the motor current exceeds a threshold current level, periods when a current error signal are generated being current limit periods, during current limit periods when the voltage error determiner fails to generate a voltage error signal, selecting the current error signal for determining the inverter frequency.

17. The method of claim 16 wherein the step of generating a slew rate signal includes generating an accelerating slew rate signal and the step of modifying includes modifying the accelerating slew rate as a function of the current limit periods.

18. The method of claim 17 wherein the step of modifying the accelerating slew rate includes reducing the accelerating slew rate as a function of the current limit periods and increasing the accelerating slew rate as a function of the non-current limit periods.

19. The method of claim 18 wherein the controller includes voltage and current sensors which periodically sample the DC bus voltage and the motor current and wherein the step of modifying includes reducing the decelerating slew rate a predefined amount each sampling instant during a voltage limit period, increasing the decelerating slew rate a predefined amount each sampling instant during a non-voltage limit period, increasing the accelerating slew rate a predefined amount each sampling instant during a non-current limit period and decreasing the accelerating slew rate a predefined among each sampling instant during a current limit period.

20. The method of claim 14 wherein a maximum decelerating slew rate is specified and the step of modifying includes increasing the decelerating slew rate only up to the maximum slew rate.

21. The method of claim 17 wherein maximum accelerating and decelerating slew rates are specified and the step of modifying includes decelerating the slew rate only up to the maximum decelerating slew rate and increases the accelerating slew rate only up to the maximum accelerating slew rate.

22. An apparatus for use with a system including a variable speed AC motor, a controller and an inverter, the inverter linked to and drawing direct current from a DC bus and linked to and supplying alternating current to the motor, the controller linked to the inverter and receiving and using an output frequency signal to control inverter frequency and thereby motor speed, the apparatus for regulating inverter frequency to maintain DC bus voltage and a supply line current amplitude below a voltage limit and a current limit, respectively, the apparatus comprising:

a determiner means linked to the DC bus for generating a voltage error signal to indicate when the DC bus voltage exceeds a threshold voltage level, periods during which a voltage error signal are generated being voltage limit periods and other periods being non-limit periods;

a slew rate means for generating a decelerating slew rate signal, the slew rate being a rate of motor frequency change;

a selector means linked to the determiner means and the rate means for selecting the error signal during limit periods and selecting the slew rate signal during non-limit periods for determining the inverter frequency; and a modifier means linked to the rate means for modifying the slew rate signal as a function of the durations of the limit and non-limit periods.

23. The apparatus of claim 22 wherein the modifier means modifies by reducing a decelerating slew rate as a function of limit period durations and increasing the decelerating slew rate as a function of the non-limit periods.

24. The apparatus of claim 23 further including a current error determiner means for generating a current error signal indicating when the motor current exceeds a threshold current level, periods when a current error signal are generated being current limit periods, during current limit periods when the voltage error determiner means fails to generate a voltage error signal, the selector means selecting the current error signal for determining the inverter frequency.

25. The apparatus of claim 24 wherein the slew rate determiner means also generates an accelerating slew rate signal and the modifier means modifies the accelerating slew rate as a function of the current limit periods.

26. The apparatus of claim 25 wherein the modifier means modifies by reducing the accelerating slew rate as a function of the current limit periods and increasing the accelerating slew rate as a function of the non-current limit periods.

27. The apparatus of claim 26 wherein maximum accelerating and decelerating slew rates are specified and the modifier means increases the decelerating slew rate only up to the maximum decelerating slew rate and increases the accelerating slew rate only up to the maximum accelerating slew rate.

* * * * *